United States Patent [19]

Turner et al.

[11] Patent Number: 4,609,177
[45] Date of Patent: Sep. 2, 1986

[54] VALVE

[75] Inventors: Larry G. Turner, Clarkston; Leo S. Stanish, Grosse Pointe Woods; Manfred Kuttruff; Walter J. Budzinski, both of Sterling Heights, all of Mich.; Robert MacDonald, Phoenix, Ariz.

[73] Assignee: Brasscraft Manufacturing Company, Southfield, Mich.

[21] Appl. No.: 788,319

[22] Filed: Oct. 17, 1985

Related U.S. Application Data

[63] Continuation-in-part of Ser. No. 713,136, Mar. 18, 1985, Pat. No. 4,562,994.

[51] Int. Cl.$^4$ ............................................. F16K 25/00
[52] U.S. Cl. .................................... 251/175; 251/182; 251/310
[58] Field of Search ................... 251/175, 182, 310

[56] References Cited

U.S. PATENT DOCUMENTS

| | | | |
|---|---|---|---|
| 2,075,459 | 3/1937 | Parker | 251/182 |
| 2,970,804 | 2/1961 | Busby | 251/175 |
| 3,136,336 | 6/1964 | Priesmeyer | 251/175 X |
| 3,529,621 | 9/1970 | Christiansen | 251/175 X |
| 3,915,428 | 10/1975 | Hay | 251/175 |

FOREIGN PATENT DOCUMENTS 2011660 9/1971 Fed. Rep. of Germany ...... 251/175

Primary Examiner—Harold W. Weakley
Attorney, Agent, or Firm—Cullen, Sloman, Cantor, Scott & Rutherford

[57] ABSTRACT

A three-piece angle stop valve comprises a valve body, resilient control sleeve and handle, with no separate fastening or sealing elements required. Inlet line pressure resiliently biases the side walls of the control sleeve and a circumferential sealing flap formed thereon into sealing engagement with the valve bore to prevent leakage. The handle is secured to the valve body by resilient formations which snap into a circumferential groove on the valve body. The handle rotates the control sleeve by means of telescoping splines. Several circumferential and axial reinforcing ribs are formed on the interior of the control sleeve.

12 Claims, 6 Drawing Figures

VALVE

RELATED APPLICATIONS

This application is a continuation-in-part of the commonly assigned application of Robert D. MacDonald, Ser. No. 06/713,136, filed Mar. 18, 1985, now U.S. Pat. No. 4,562,994.

BACKGROUND OF THE INVENTION

This invention relates to stop valves commonly used in water supply lines leading to sinks, toilets and the like. A stop valve is simply a shut-off valve to permit replacement of washers or other repairs to be accomplished on a fixture valve without shutting down an entire plumbing system. The stop valve is commonly located in the fixture supply line between the wall and the fixture. Stop valves are generally available in two basic styles. One style is known as an angle stop valve, wherein the inlet and outlet of the valve are at right angles to each other. The other standard configuration is a straight-through arrangement wherein the inlet and outlet are coaxially aligned with each other.

The most common type of stop valve construction requires about eight or nine separate pieces. The valve body is typically metal and has externally threaded inlet and outlet openings to receive the conventional conduit connections such as a compression ring and compression nut. The valve body also conventionally has a neck portion which is internally threaded to receive the rotatable valve stem and externally threaded to receive the stem-retaining bonnet. The stem has an annular bib washer which is snapped or screwed onto the inner end and which engages the valve seat within the valve body. The stem-retaining bonnet normally has a washer and packer beneath it to seal the neck around the rotatable and axially moveable valve stem. Finally, the operating handle is normally retained to the valve stem by a screw.

The prior art has sought to simplify the construction of the above-described conventional stop valves by eliminating some of the multiplicity of parts. One modified form replaces the externally threaded valve stem and seat-engaging bib washer with a hollow radially resilient rotatable sleeve which has one or more ports in its cylindrical side wall. In the off or closed position of the sleeve, line pressure enters the sleeve interior and radially expands the resilient cylindrical side walls of the sleeve to prevent water leakage between the exterior of the sleeve and the bore of the valve body. When the sleeve is rotated by a handle to the open position, the side port of the sleeve becomes circumferentially aligned with the outlet bore of the valve body, permitting flow to be established. In the case of an angle stop valve, the valve body inlet bore is coaxial with the sleeve and in continuous communication with the interior of the sleeve. In the straight-through form of the stop valve, the axis of the sleeve is perpendicular to that of the coaxially aligned inlet and outlet bores of the valve body. There are typically two diametrically opposite ports in the side wall of the sleeve, to selectively communicate with the inlet and outlet bores of the valve body. Representative prior art patents showing resilient sleeve valve constructions are the United States Patents to Buffet (U.S. Pat. No. 329,809), Taft (U.S. Pat. No. 1,160,342), Myers (U.S. Pat. No. 2,832,562), Richter (U.S. Pat. No. 2,967,042), Eggers (U.S. Pat. No. 3,353,785), Christiansen (U.S. Pat. No. 3,529,621), Redman (U.S. Pat. No. 4,207,732) and Schrock (U.S. Pat. No. 4,314,581).

It is the principal object of the present invention to improve the resilient sleeve type of stop valves described in the above-listed prior art patents by further simplifying and reducing the number of components to achieve improved economy of manufacture and reliability of operation, while preventing leakage through the valve.

SUMMARY OF THE INVENTION

The stop valve of the present invention includes just three parts: valve body, resilient control sleeve and handle. No supplementary sealing or securing elements are required. The handle is secured to the valve body by formations which resiliently snap into a circumferential ring on the valve body. Cooperating splines provide a driving connection between the handle and control sleeve to cause them to rotate together. A collar in the valve body bore engages a shoulder on the sleeve to prevent the sleeve from being out of the valve in the event of excessive fluid pressure and failure of the handle-retaining formations. The control sleeve has a resilient circumferential sealing flap which is dimensioned to provide an interference fit with the valve body bore, providing an effective seal and frictionally preventing withdrawal of the sleeve. The inlet end of the control sleeve has a reduced wall thickness to increase its radial yieldability to provide increased sealing pressure under low fluid pressure conditions.

DETAILED DESCRIPTION

Figure 1:
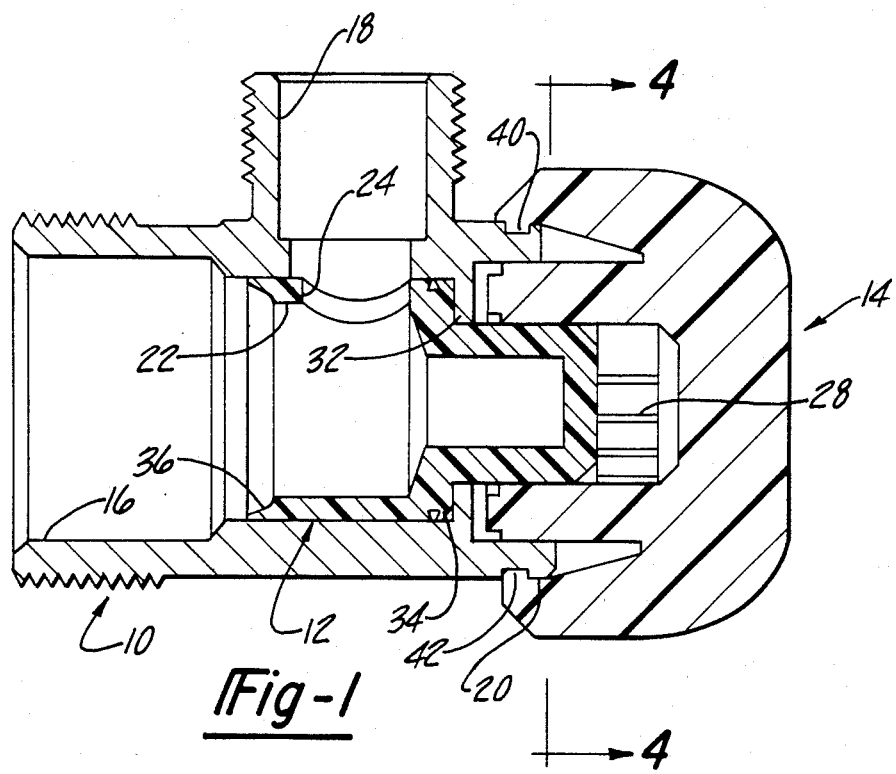
FIG. 1 is a cross-sectional view of the stop valve assembly of the present invention, shown in the open condition of the valve.

FIG. 1 illustrates an angle stop valve of the type wherein a one-quarter turn of the handle is sufficient to change the condition of the valve from the illustrated fully open condition to fully closed. The valve generally comprises a valve body 10 which receives a resilient control sleeve 12 which is selectively rotated by a handle 14.

The valve body 10 includes inlet bore 16 adapted to be connected to a water supply line, outlet bore 18 adapted to be connected to a outlet line and neck 20 which rotatably supports and interconnects with handle 14 in a manner to be described below.

Resilient control sleeve 12 is rotatably mounted within valve body inlet bore 16 and is inserted from the opening thereof, that is, from the left toward the right as viewed in FIG. 1. The cylindrically shaped side wall of control sleeve 12 is provided with a port 24 which may be selectively brought into registry with valve body outlet bore 18 to establish a fluid flow path from inlet bore 16, through sleeve bore 22 and port 24 and finally out through outlet bore 18.

Figure 4:
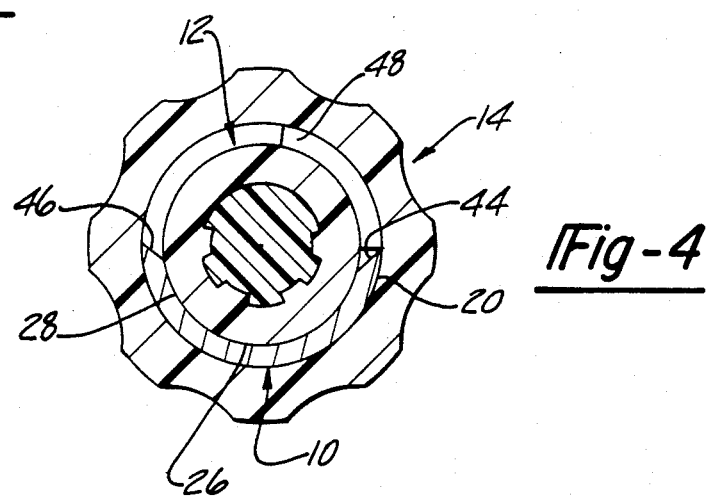
FIG. 4 is a cross-sectional view of the assembly, viewed in the direction of arrows 4—4 of FIG. 1.

The closed or right-hand end of control sleeve 12 is of reduced diameter and is provided with longitudinally extending splines 26 which telescopically interfit with internal splines 28 in handle 14. As best shown in FIG. 4, these splines as asymmetrically arranged around the circumference of the control sleeve so that the handle and control sleeve can only be assembled in one relative angular relationship. This feature, when coupled with appropriate positional indicia on the exterior of the handle, permits the operator to determine the on-off condition of the valve.

Control sleeve 12 is further provided with a radially projecting circumferential sealing lip or flap 34 immediately adjacent to a circumferential groove 35 and abutting valve body collar 32. The outer diameter of flap 34 is shaped and dimensioned to be larger than the opposed bore of valve body, so that assembly results in flap 34 being forced radially inwardly and toward the left to establish a continuous radially outward sealing pressure against the valve body bore. The diameter of the main body portion of control sleeve 12 is dimensioned to be very snuggly received within the opposed portion of valve body inlet bore 16, to minimize any potential for water leakage therebetween. However, if any leakage occurs along the outer diameter of the sleeve, the water will enter groove 35 and pressurize the left side of flap 34, tending to increase its outward pressure against the valve body bore to further enhance the seal at that interface. Furthermore, the dimensions and shape of flap 34 also cause it to increase its frictional engagement with the valve body bore if the sleeve moves toward the left, thereby preventing misalignment of port 24 and bore 18 and preventing removal of the sleeve from the valve body.

As a further aid in preventing leakage between the outer periphery of control sleeve 12 and inlet bore 16, the inlet end of control sleeve 12 is formed with an end lip 36 of reduced wall thickness. Therefore, even under low fluid pressure conditions, this locally weakened portion of the control sleeve 12 will tend to be forced radially outwardly against the valve body bore by the fluid pressure which always exists within the interior bore 22 of the control sleeve.

Figures 2, 3:
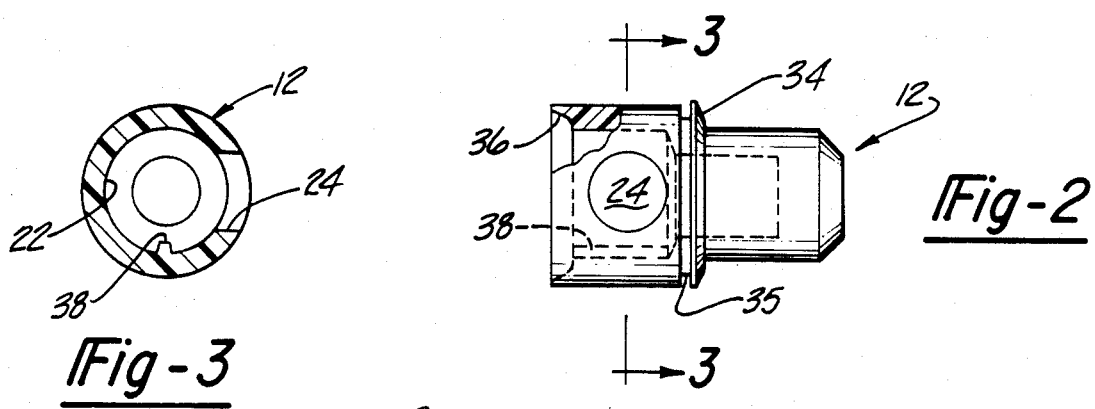
FIG. 2 is a top view of the control sleeve of FIG. 1.
FIG. 3 is a cross-sectional view of the control sleeve, viewed in the direction of arrows 3—3 of FIG. 2.

As shown in FIG. 3, control sleeve 12 is further provided with a single longitudinally extending reinforcing rib 38 along its internal bore 22. The axial position and length of rib 38 is selected to substantially correspond with the diameter of the valve body outlet bore 18, and the angular position of such rib is spaced a quarter turn from control sleeve port 24. This arrangement places rib 38 directly across the diameter of valve body outlet bore 18 when the control sleeve is in its closed position. The rib locally increases the stiffness of the control sleeve wall and prevents it from bulging radially outwardly into outlet bore 18 under high fluid pressure conditions when the valve is in its closed position. Such bulging would be undesirable because it would tend to produce wear on the exterior surface of the control sleeve as such surface rubbed against the opposed edges of the outlet bore opening when the control sleeve was moved from the closed toward the open position.

Neck 20 of valve body 10 has a circumferential groove 40 which receives a plurality of circumferentially spaced radially inwardly projecting handle retaining bosses 42. As can be seen in FIG. 1, handle 14 is constructed so that its outer circumference is radially yieldable as the handle is pressed toward the left over the conically configured tip of valve body neck 20. Continued leftward movement of the handle causes retaining lips 42 to be cammed radially outwardly until they snap resiliently inwardly into neck groove 40. In this manner, handle 14 is rotatably mounted on and connected to valve body 10, without the need for any supplementary fastening devices. As previously described, such leftward movement of handle 14 during assembly is permitted by the telescoping interfitting relationship of splines 26 with splines 28 of the previously inserted control sleeve, once the proper angular relationship is established between handle 14 and control sleeve 12.

As shown in FIGS. 1 and 4, the extreme right-hand end of neck 40 is recessed for approximately one-half of its circumference, establishing rotation stop faces 44 and 46 where the recessed portion meets the unrecessed portion. In cooperation with handle stop boss 48 (See FIG. 4), rotation of handle 14 in the counterclockwise direction (as viewed in FIG. 4) from the position shown causes stop boss 48 to abut stop face 46, thereby establishing the closed position after a little more than 90 degrees of rotation. Similarly, rotation in the clockwise direction from such closed position to the illustrated open position of the valve brings the other end of stop boss 48 into abutting engagement with the other stop face 44, establishing the open position of the valve. As is evident from FIG. 4, the angular extent of stop boss 48 is slightly less than 90 degrees in the preferred embodiment of the invention.

Collar 32 of the valve body serves several functions. First, it establishes the proper axial position of the control sleeve relative to the outlet bore 18 by its abutting engagement with the shoulder on control sleeve 12 adjacent sealing flap 34. This engagement assures the proper axial registry of port 24 with outlet bore 18. Second, collar 32 also provides a safety feature in that fluid pressure cannot blow or force control sleeve 12 out to the right through valve body neck 20 in the event that the interlock between the handle 14 and neck groove 40 has been destroyed or the handle has otherwise been removed from the valve body.

The valve body is preferably formed of extruded brass which is subsequently machined. The control sleeve is formed of a low friction resilient thermoplastic material, preferably Santoprene 273-40, manufactured by Monsanto. The handle can be formed of a durable plastic material such as ABS having a proper degree of resilience to permit its assembly to the valve body in the manner described above.

It is contemplated that an alternative embodiment of the invention may be constructed with the portion of control sleeve 12 to the left of circumferential groove 35 being formed with a conical rather than cylindrical wall. That is, the diameter would be progressively greater toward the open left end of the sleeve.

Figure 5:
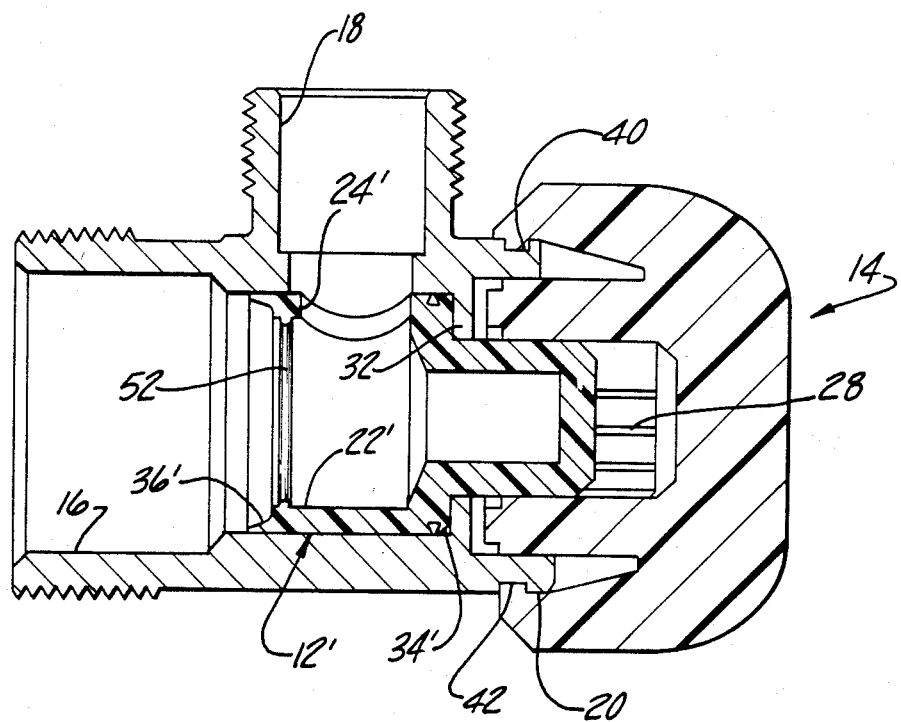
FIG. 5 is a view similar to FIG. 1, but showing a modified embodiment of the control sleeve.
Figure 6:
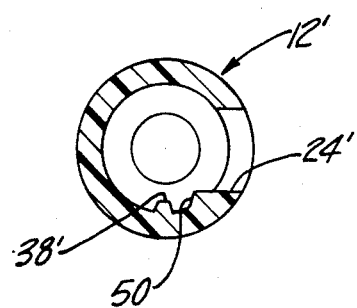
FIG. 6 is a view similar to FIG. 3, but showing the modified sleeve of FIG. 5.

FIGS. 5-6 illustrate two additional optional features. One is the inclusion of an additional internal longitudinal rib 50 at the leading edge of port 24 as the valve is turned to the closed position. In this position, such additional rib provides additional rigidity as the pressure within the sleeve builds up, during valve closing, to prevent the sleeve from ballooning or bulging outwardly into the outlet port. Another optional feature is the inclusion of a radially inwardly projecting circumferential rib 52 adjacent to end flap 36, which rib provides additional stiffness to the sleeve wall to prevent it from collapsing radially inwardly. Finally, for additional protection against leakage, should it be considered necessary, an O-ring can be provided around the portion of handle 14 which extends inside valve body neck 20, with appropriate O-ring-receiving grooves being provided.

This invention may be further developed within the scope of the following claims. Accordingly, the above specification is to be interpreted as illustrative of only a single operative embodiment of the present invention, rather than in a strictly limited sense.

We now claim:

1. A plumbing valve comprising:

a valve body having an inlet bore and and outlet bore;

a resilient control sleeve located within said valve body for rotation therein, said sleeve being open at one axial end and closed at the other axial end, and having a side wall of circular cross-section between said ends, said side wall having at least one port;

said control sleeve side wall having a first portion contoured and dimensioned to be snuggly but rotatably received within a sleeve receiving bore of said valve body, said valve body sleeve bore communicating with both said inlet and said outlet bores;

a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;

said valve body and said control sleeve being constructed to maintain continuous communication between said inlet bore and the interior of said control sleeve, to thereby pressurize said interior and resiliently bias said side wall radially outwardly against said valve body sleeve bore;

said valve body sleeve bore having a collar portion of smaller internal diameter than the adjacent portions of said valve body sleeve bore on each side of said collar, said diameter of said collar portion also being less than said outer diameter of said first portion of said control sleeve, whereby said collar acts as a stop to limit axial travel of said control sleeve along the length of said valve body sleeve bore;

said first portion of said control sleeve having a circumferential groove and a circumferential sealing flap located between said groove and said collar portion, said sealing flap having an outer diameter greater than the internal diameter of the opposed portion of said valve body sleeve bore and contoured to pivot radially inwardly and axially toward said open end of said sleeve bore and partially into said circumferential groove as a result of the interference fit with the walls of said valve body sleeve bore.

2. The valve of claim 1 wherein said handle includes retaining formations formed thereon for engaging complementary retaining formations on said valve body for connecting said handle to said valve body without separate fastening elements, while permitting said handle to rotate relative to said valve body.

3. The valve of claim 1 wherein said handle includes driving formations integrally formed thereon for establishing a rotary driving connection with complementary driving formations integrally formed on said closed end of said control sleeve for rotating said control sleeve within said sleeve bore.

4. The valve of claim 1 which consists solely of said valve body, said control sleeve and said handle, without any separate sealing or fastening components to secure and seal said three elements together.

5. A plumbing valve comprising:

a valve body having an inlet bore and an outlet bore;

a resilient control sleeve located within said valve body for rotation therein, said sleeve being open at one axial end and closed at the other axial end, and having a side wall of circular cross-section between said ends, said side wall having at least one port;

said control sleeve side wall having a first portion contoured and dimensioned to be snuggly but rotatably received within a sleeve receiving bore of said valve body, said valve body sleeve bore communicating with both said inlet and said outlet bores;

a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;

said valve body and said control sleeve being constructed to maintain continuous communication between said inlet bore and the interior of said control sleeve, to thereby pressurize said interior and resiliently bias said side wall radially outwardly against said valve body sleeve bore;

said first portion of said control sleeve side wall having a substantially reduced wall thickness immediately adjacent said open end as compared with the adjacent portions of said first portion side wall, to facilitate radially outward deflection thereof into tighter sealing contact against said valve body sleeve bore during relatively low fluid pressure conditions.

6. The valve of claim 1 wherein the bore of said control sleeve has a radially inwardly projecting circumferential reinforcing rib located between said port and said end portion of reduced wall thickness.

7. A plumbing valve comprising:

a valve body having an inlet bore and an outlet bore;

a resilient control sleeve located within said valve body for rotation therein, said sleeve being open at one axial end and closed at the other axial end, and having a side wall of circular cross-section between said ends, said side wall having at least one port;

said control sleeve side wall having a first portion contoured and dimensioned to be snuggly but rotatably received within a sleeve receiving bore of said valve body, said valve body sleeve bore communicating with both said inlet and said outlet bores;

a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;

said valve body and said control sleeve being constructed to maintain continuous communication between said inlet bore and the interior of said control sleeve, to thereby pressurize said interior and resiliently bias said side wall radially outwardly against said valve body sleeve bore;

said first portion of said control sleeve side wall having a radially inwardly projecting reinforcing rib extending axially therealong, said rib being circumferentially positioned to stiffen the portion of said side wall which blocks said valve body outlet bore in the fully closed position of said valve, thereby to reduce the tendency of high fluid pressure within said control sleeve to cause said side wall to bulge radially outwardly into said outlet bore.

8. The valve of claim 7 wherein said first portion of said control sleeve side wall has a second radially inwardly projecting reinforcing rib extending axially therealong, said rib being circumferentially positioned immediately adjacent said port on the side of said port which advances across said valve body outlet bore during closing of the valve, thereby to reduce the tendency of high fluid pressure within the control sleeve to cause said side wall to bulge radially outwardly into said outlet bore in the partially closed position of the valve.

9. The valve of claim 7 wherein said first portion of said control sleeve side wall having a substantially reduced wall thickness immediately adjacent said open end as compared with the adjacent portions of said first portion side wall, to facilitate radially outward deflection thereof into tighter sealing contact against said valve body sleeve bore during relatively low fluid pressure conditions.

10. The valve of claim 9 wherein the bore of said control sleeve has a radially inwardly projecting circumferential reinforcing rib located between said port and said end portion of reduced wall thickness.

11. The valve of claim 7 wherein said handle includes retaining formations formed thereon for engaging complementary retaining formations on said valve body for connecting said handle to said valve body without separate fastening elements, while permitting said handle to rotate relative to said valve body.

12. The valve of claim 7 which consists solely of said valve body, said control sleeve and said handle, without any separate sealing or fastening components to secure and seal said three elements together.

* * * * *

UNITED STATES PATENT OFFICE
CERTIFICATE OF CORRECTION

Patent No. 4,609,177            Dated September 2, 1986

Inventor(s) Larry G Turner, Leo S. Stanish, Manfred Kuttruff, Walter J. Budzinski and Robert MacDonald It is certified that error appears in the above-identified patent and that said Letters Patent are hereby corrected as shown below:

At Column 6, Line 43, "claim 1" should be -- claim 5 --.

Signed and Sealed this
Sixteenth Day of December, 1986

Attest:

DONALD J. QUIGG

*Attesting Officer*      *Commissioner of Patents and Trademarks*